June 2, 1925.  J. B. GLOWACKI  1,540,118
CARTRIDGE FUSE, KNIFE BLADE TYPE FOR REMOVABLE FUSE ELEMENTS
Filed Feb. 1, 1922  2 Sheets-Sheet 1
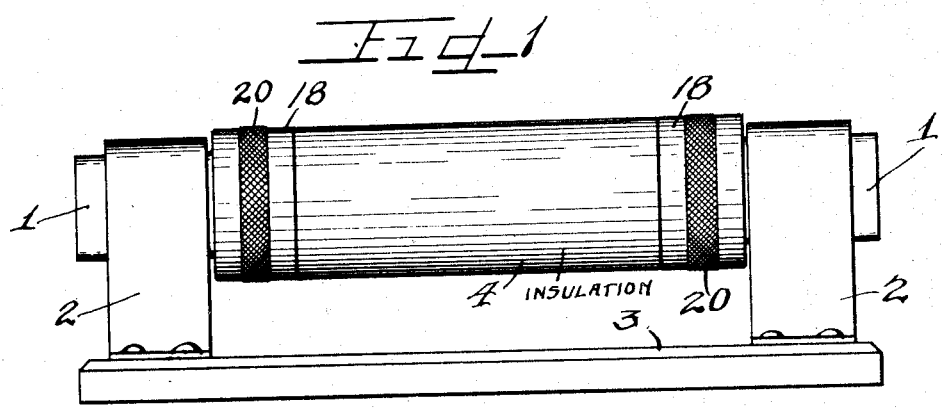
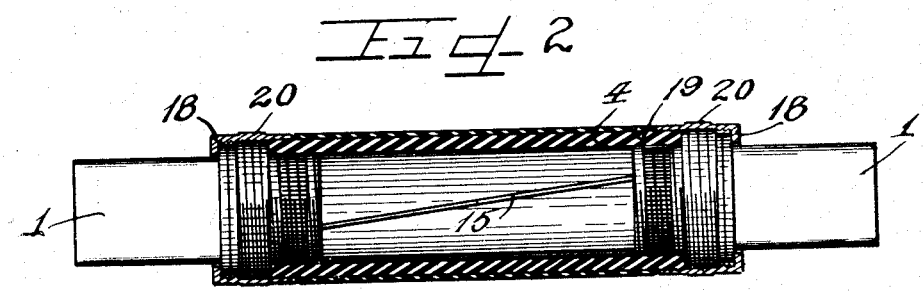
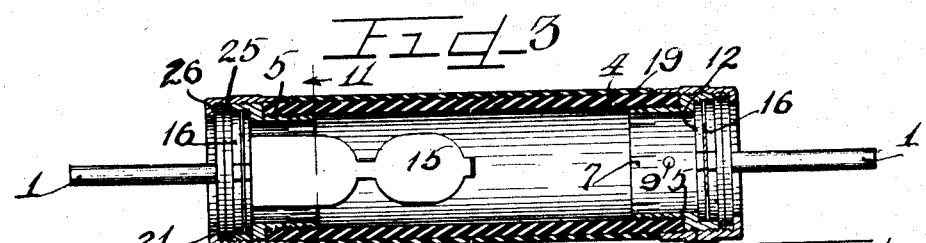
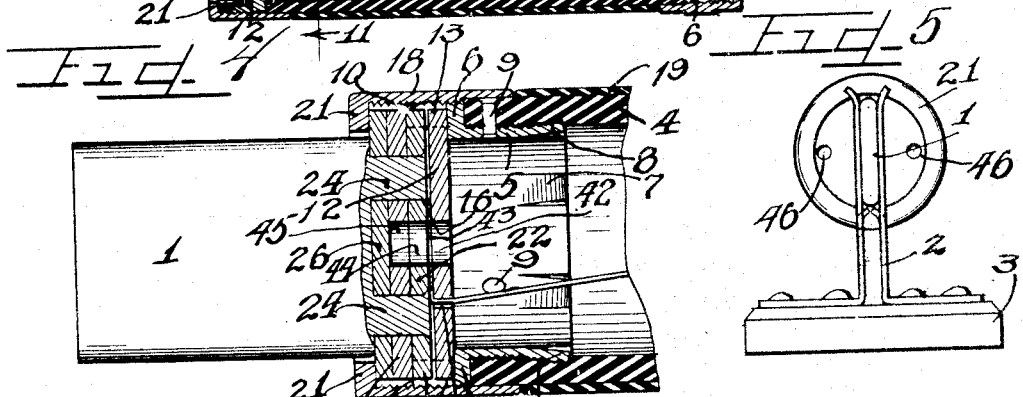
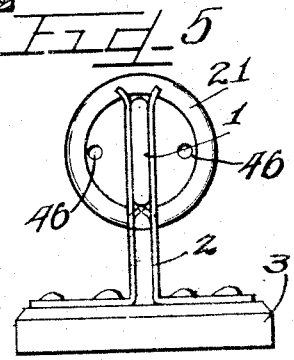
Witnesses
J. W. Angell
Carlton Hill
Inventor
John B. Glowacki
by [signature] Atty June 2, 1925. 1,540,118
J. B. GLOWACKI
CARTRIDGE FUSE, KNIFE BLADE TYPE FOR REMOVABLE FUSE ELEMENTS
Filed Feb. 1, 1922 2 Sheets—Sheet 2
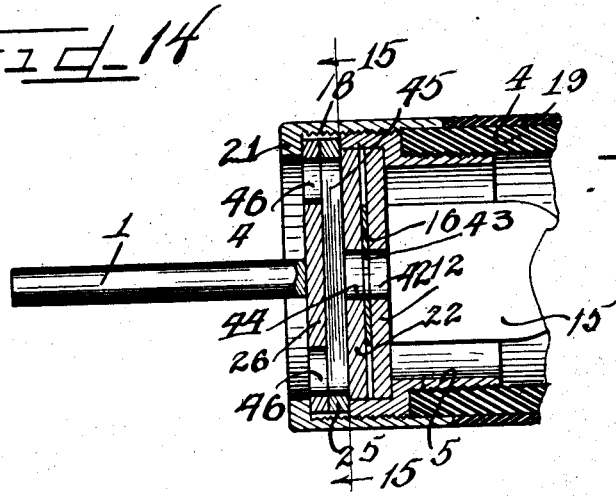
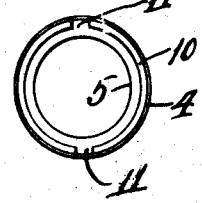
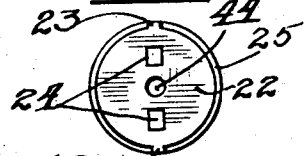
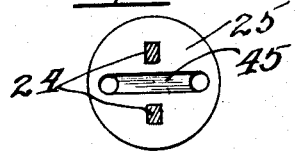
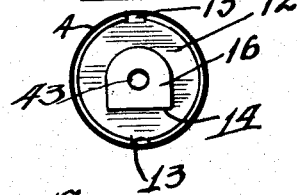
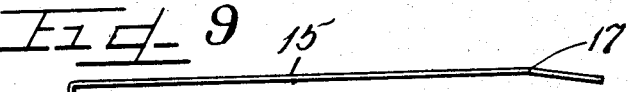
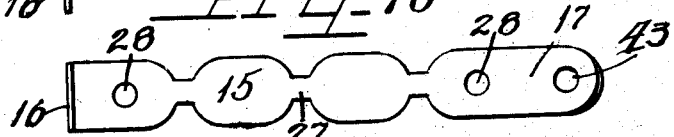
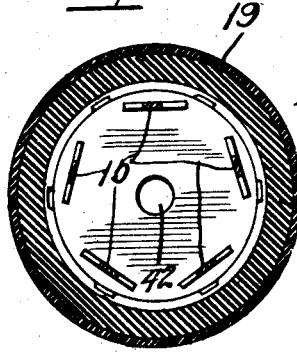
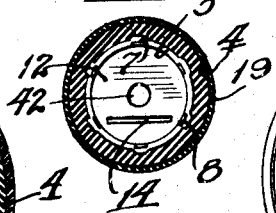
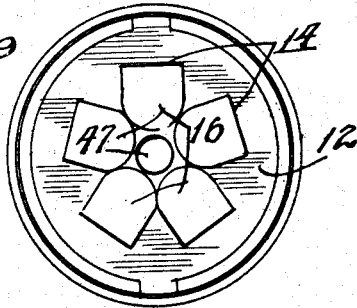
Witnesses
J. W. Angell
Carlton Hill
Inventor
John B. Glowacki
by Charles W. Hill
Atty Patented June 2, 1925.

1,540,118

UNITED STATES PATENT OFFICE.

JOHN B. GLOWACKI, OF CHICAGO, ILLINOIS.

CARTRIDGE FUSE, KNIFE-BLADE TYPE FOR REMOVABLE-FUSE ELEMENTS.

Application filed February 1, 1922. Serial No. 533,193.

*To all whom it may concern:*

Be it known that I, JOHN B. GLOWACKI, a citizen of the Republic of Poland, and a resident of the city of Chicago, in the county of Cook and State of Illinois, have invented certain new and useful Improvements in a Cartridge Fuse, Knife-Blade Type for Removable-Fuse Elements; and I do hereby declare that the following is a full, clear, and exact description of the same, reference being had to the accompanying drawings, and to the numerals of reference marked thereon, which form a part of this specification.

It is an object of this invention to provide a fuse of the cartridge type in which the fusible element may be replaced without the use of tools.

It is a further object of this invention to provide a fuse of the cartridge type which may be readily and quickly assembled or taken apart without the need of any tools for that purpose.

It is a further object of this invention to provide a fuse cartridge which shall afford a higher degree of heat insulation than has heretofore been used.

It is a further object of this invention to provide a vent for the gaseous products of the blowing of the fuse which shall permit escape of said products without permitting egress of any flame.

It is a further object of this invention to provide a fuse cartridge which may be adapted to carry heavy currents by the use of more than one fusible element without danger of the several fusible elements being welded to one another.

Other and further important objects of this invention will be apparent from the disclosures in the drawings and specification.

The invention (in a preferred form) is illustrated in the drawings and hereinafter more fully described.

On the drawings:

Figure 1 is a side view of a fuse cartridge in its clips.

Figure 2 is a longitudinal section of the cartridge.

Figure 3 is a section in a plane at right angles to that of Figure 2.

Figure 4 is an enlarged view, partly in section, of one end.

Figure 5 is an end view of the cartridge and clips.

Figure 6 is a view of the end member of the cartridge, looking at that end of the member which is toward the center of the cartridge.

Figure 7 is an end view of the cartridge sleeve.

Figure 8 is a view similar to Figure 7, with the closure plates inserted and the end of the fusible strip showing.

Figure 9 is an edge view of the fusible strip.

Figure 10 is a plan view thereof.

Figure 11 is a section on the line 11—11 of Figure 3, with the fusible strip omitted.

Figure 12 is a view similar to Figure 11, showing a modification and including a number of fusible strips.

Figure 13 is a view similar to Figure 8, showing the modification illustrated in Figure 12.

Figure 14 is a section similar to Figure 4 but in a plane at right angles thereto.

Figure 15 is a section on the line 15—15 of Fig. 14.

As shown on the drawings:

The cartridge is provided with the usual knife-blade contacts 1 at each end, which are frictionally received between upstanding clips 2 supported from a base 3.

The main body of the cartridge consists of a cylinder of fibre or other insulating material 4, which is supplied with reinforcing bushings 5 at each end. Preferably these bushings have annular flanges 6 which abut against the edge of the cylinder 4. The bushings 5 are secured to the cylindrical casing 4 by having tongues 7 pressed radially out from the true cylindrical shape so that they enter the material of the cylinder 4, as shown at 8. If desired, the bushings may be secured to the cartridge chamber by threading the same to engage threads formed in the fibre and by threading the same to engage threads formed in the fibre and by rivets 9 in addition to the fastening already described.

Upstanding from the edge of the bushings 5 is a cylindrical wall 10, which occupies a part of the width of the flange 6. At two diametrical points 11 this wall is cut away to form notches. Each bushing is closed by a disk 12 which is provided with a pair of tongues 13 to seat in the notches 11 and so give a definite position to the disk. The disk 12 has a slot 14 which is to receive an end of the fusible member 15, the member being passed through the slot and then laid flat against the disk 12, as indicated at 16. The disk 12 is also provided with a central aperture 42.

The fusible members, before being inserted in the cartridge, have one end 16 bent at right angles to the main strip and at the point 17, where the other end is to be bent when in the cartridge, a slight bend is made for convenience in assembling, as shown in Figures 9 and 10. When assembled, the bent ends lie flat against the disks 12 and the fusible member is additionally bent during the assembling in order to produce this result. At each end the strip 15 is provided with a perforation 43 which, when the cartridge is assembled, registers with the openings 42.

The flange 6 and wall 10 are provided with threads on their outer surface to engage the internal threads of a cap 18. If desired, the cylinder 4 may be surrounded by an envelope 19, also of fibre, which is shrunk on or secured in any other desirable manner. This envelope is of a thickness to make the outer surface of the finished cartridge flush with the outer surface of the cap 18. In order that the cap 18 may be screwed and unscrewed easily, it has a central portion 20 which is knurled. If desired, the knurled surface may stand slightly higher than the rest of the surface of the cap.

The top of the cap consists of an annular inturned flange 21 which serves to retain the contact blade 1 in place. The contact blade is fastened in place by washers which are rigid therewith and whose diameter is sufficient to fill the interior of the cap. The innermost of these washers 22 is provided with lugs 23 which project into the notches 11, and with an opening 44 to register with the opening 43. The washer 22 and the other washers between it and the blade 1 are all secured to the blade by a pair of tongues 24, the ends of which are upset to secure the washers in place. Next to the washer 22 is a washer 25. This washer and the washer 26 next to it are of larger diameter than the washer 22, extending to the ends of the lugs 23. The washer 22 is received within the wall 10 but the washers 25 and 26 extend over the edge of this wall.

The washer 25 is made of metal or other material. It is provided with a slot 45, the central portion of which registers with the opening 44. The ends of this slot extend into register with a pair of holes 46 in the external washer 26 which serves to reinforce the washer 25 and to assist in holding it in place and to provide gas vents.

In larger sizes of cartridges intended to hold a plurality of fusible elements 15, instead of arranging the elements parallel to one another and in contact throughout most of their length, the elements are separated and spaced around the cylinder, as shown in Figure 12. For securing such elements in position, the plates 12, instead of having one slot 14, have as many as there are elements 15, and the ends 16 of the elements are laid over against the plates as shown in Figure 13. In this form the holes 43 in the ends 16 of the fusible strips 15 are not needed but a central hole 47 corresponding to the hole 42 is provided and the other washer openings registering therewith analogous to those already described.

In assembling the device, one of the plates 12 is engaged over the fusible element 15 by passing the end of the element through the slot 14. Before doing this, the plate 12 is placed in its position in one end of the bushing flange 5, the notches 11 receiving the lugs 13 and the element 15 being within the cylinder. The other plate 12 is then engaged over the other end of the element 15 and its lugs 13 are received in the notches 11 at that end of the bushing flange. The partially bent end of the element 15 is then bent down flat against the plate 12. If there are several elements 15, they are inserted in the several slots 14 in the first plate and bent down over the second plate in the way just described for one element. The blade 1, the washers 22, 25 and 26 are secured together to constitute a unit, which is next put in place. One of these units is placed in each end of the cartridge with the ears 23 entering the notches 11. The position of the notches will insure that the blades 1 will occupy the same plane at the two ends of the cartridge. A cap 18 is then placed over the blade 1 and screwed onto the cartridge at each end. The cartridge with the fuse enclosed therein is then forced into the clips 2 and the device is ready for use.

When the current through the fuse is too great, the fuse will melt. Ordinarily this melting will occur at some narrow portion of the fuse, such as 27 in Figure 10, but if there is a sudden flow of very heavy current the fuse may melt not only at this point but at other points also. If a plurality of fuses are enclosed in one cartridge, this melting may result in welding one or more pairs of fuses or parts of fuses together, with the result that the electrical machinery may be short circuited. But if the several fuses are arranged as illustrated in Figures 12 and 13, this cannot happen.

It will often happen when the fuse is blown that some of the strip 15 is vaporized, filling the cartridge with hot fumes, or there may even be a chemical action between the fuse and the air making an actual flame in the cartridge. These fumes or flame escape through the openings 42 to 46, but as this passage is long and contains several right-angle turns it is unlikely that the fumes by the time they emerge will be hot enough to do harm or will have velocity enough to be capable of having any effect. For the same reason, it is unlikely that any flame will ever get as far as the outside of the cartridge.

The holes 28 in the fuse element shown in Figure 10 are provided in order that the fuse may be used with that style of cartridge which requires that a post go through such holes. Thus the same fuse may be used with the cartridge herein described or with other styles of cartridge, as desired.

I am aware that numerous details of construction may be varied through a wide range without departing from the principles of this invention, and I therefore do not purpose limiting the patent granted otherwise than necessitated by the prior art.

I claim as my invention:

1. In a fuse cartridge a casing having notches in the ends thereof, a plurality of contact blades, a plurality of superimposed disks rigidly secured to each of said contact blades and having openings therein to afford circuitous outlets for gases, lugs integrally formed on one of said disks for each contact blade, adapted to engage in the casing notches to positively hold the contact blades in the same plane, and means for securing the contact blades and said disks in position.

2. A fuse cartridge comprising a casing, a pair of contact blades, a plurality of superimposed disks rigidly secured to one end of each of said contact blades, said disks having communicating staggered openings therein, lugs integrally formed on one of said disks adapted to engage in the casing notches to positively position the contact blades in the same plane, and caps removably engaging said casing and disks for holding the contact blades secured in position.

3. In a fuse cartridge, a closure for each end thereof comprising a knife-blade, an outer disk having a plurality of openings therein, an inner disk having an opening therein, and an intermediate disk having a slot therein communicating with the openings in said outer and inner disks, said disks all rigidly secured to said knife-blade to form a unitary closure.

4. A fuse cartridge comprising a casing, a fuse element therein, slotted and apertured disks in said casing through which the fuse element projects and against which portions of said fuse element are bent, knife-blade units closing the ends of the casing and having circuitous passages therein for the escape of gases from the casing, and retaining caps for holding the knife-blade units in place.

5. A fuse cartridge comprising a casing, a fuse element therein, notched bushings rigidly secured in the ends of said casing, slotted disks through which said fuse element projects and against which portions of said fuse element are bent, and slotted disks having gas outlet apertures therein, projections on said disks adapted to seat in the notches of said bushings to hold said disks against rotation, end closure members for said casing, each end closure member embracing a contact blade having rigidly secured thereto an outer disk provided with diametrically opposite apertures, an intermediate disk having a slot positioned to register with said outer disk apertures, an inner disk having an opening positioned to register with said slot, projections formed on said inner disk adapted to seat in the bushing notches to hold the knife blade positioned in a predetermined plane, and retaining caps for holding the end closure members secured to the casing.

In testimony whereof I have hereunto subscribed my name in the presence of two subscribing witnesses.

JOHN B. GLOWACKI.

Witnesses:
CARLTON HILL,
JAMES M. O'BRIEN.